(12) United States Patent
Michael et al.

(10) Patent No.: US 8,201,196 B2
(45) Date of Patent: Jun. 12, 2012

(54) METHOD AND SYSTEM FOR CONVEYING SMS MESSAGES VIA A TV COMMUNICATION INFRASTRUCTURE FOR RECEIPT BY A TV SET-TOP BOX

(75) Inventors: Erez Michael, Kadima (IL); Shlomi Kringel, Ramat Gan (IL)

(73) Assignee: Comverse, Ltd., Tel Aviv (IL)

( * ) Notice: Subject to any disclaimer, the term of this patent is extended or adjusted under 35 U.S.C. 154(b) by 1612 days.

(21) Appl. No.: 10/158,072

(22) Filed: May 31, 2002

(65) Prior Publication Data

US 2003/0226143 A1     Dec. 4, 2003

(51) Int. Cl.
*H04N 7/10* (2006.01)

(52) U.S. Cl. ............. 725/32; 725/105; 455/466

(58) Field of Classification Search .......... None
See application file for complete search history.

(56) References Cited

U.S. PATENT DOCUMENTS

| | | | | |
|---|---|---|---|---|
| 5,850,218 | A * | 12/1998 | LaJoie et al. | 725/45 |
| 6,606,481 | B1 * | 8/2003 | Tegler et al. | 725/63 |
| 6,701,524 | B1 * | 3/2004 | Okamura et al. | 725/37 |
| 6,762,773 | B2 * | 7/2004 | Kolde et al. | 715/716 |
| 6,816,724 | B1 * | 11/2004 | Asikainen | 455/414.1 |
| 6,904,285 | B2 * | 6/2005 | Drozt et al. | 455/450 |
| 7,010,312 | B1 * | 3/2006 | Zechlin | 455/466 |
| 7,571,458 | B1 * | 8/2009 | Eyal | 725/137 |
| 2002/0003882 | A1 * | 1/2002 | Jones | 380/210 |
| 2002/0059596 | A1 * | 5/2002 | Sano et al. | 725/39 |
| 2003/0030751 | A1 * | 2/2003 | Lupulescu et al. | 348/552 |
| 2003/0149990 | A1 * | 8/2003 | Anttila et al. | 725/105 |
| 2005/0169255 | A1 * | 8/2005 | Shimomura et al. | 370/352 |

FOREIGN PATENT DOCUMENTS

| | | |
|---|---|---|
| WO | WO 98/56181 A1 | 12/1998 |
| WO | WO 9963729 A2 * | 12/1999 |
| WO | WO 01/63883 A2 | 8/2001 |

* cited by examiner

*Primary Examiner* — Kristine Kincaid
*Assistant Examiner* — Oschta Montoya
(74) *Attorney, Agent, or Firm* — Ohlandt, Greeley, Ruggiero & Perle, L.L.P.

(57) ABSTRACT

SMS messages are conveyed via a TV communication infrastructure for receipt by a TV set-top box having a unique ID. The SMS messages are sent by a cellular telephone to a cellular service provider and are encoded with a unique ID of a destination TV subscriber's TV set-top box so as to be identifiable as destined for the TV communication infrastructure. After identifying that an SMS message is destined for the TV communication infrastructure, the cellular service provider forwards the SMS message to a TV communication gateway, which processes the SMS message, including identifying the unique ID of the TV subscriber's TV set-top box, and forwards data relating to the SMS message to the TV subscriber's TV set-top box.

13 Claims, 6 Drawing Sheets

METHOD AND SYSTEM FOR CONVEYING SMS MESSAGES VIA A TV COMMUNICATION INFRASTRUCTURE FOR RECEIPT BY A TV SET-TOP BOX

FIELD OF THE INVENTION

This invention relates to SMS (short message service) messaging via a cable television (CATV) infrastructure or satellite broadcast channels.

BACKGROUND OF THE INVENTION

The increasing development of communication systems of one form or another and the infrastructure and expense that is required to maintain them has motivated the service providers of those systems to provide various "added value" services. Thus, it is known for cable television (CATV) providers to allow subscribers to send SMS messages via the CATV system. One example is disclosed in WO 9856181 entitled "System at telecommunications network" (Tegler et al.) assigned to Telia AB of Sweden and published Dec. 10, 1998. This reference relates to an interactive broadband service such as digital transmission of video channels, specifically using the GSM-system. By way of example there is described a service which requires low capacity in uplink and that utilizes the SMS function in GSM. Interactive traffic between the transmitting and receiving equipment is managed by an interactive center which is arranged to execute wanted broadband service. The interactive center is also coupled to a distributive center for distribution of the broadband signals out on the telecommunications network.

Such an arrangement is typical of known systems that allow a TV set-top box to send SMS messages via the cellular network. Digital TV operators are known who provide a service where a TV subscriber can send SMS messages via his TV set to a mobile subscriber.

This may typically be implemented by communicating with an SMS gateway that receives the SMS messages from the TV subscribers and sends them through the existing SMSC (Short Message Service Center) machines on each of the wireless operators' networks. The SMS gateway sends SMS messages using SMSC machines that are located at the wireless operators. This is similar to the ability to send SMS messages from a PC, by using a web site that offers this kind of service, as is known in the art.

It would clearly provide an expanded and useful service to allow SMS to be received at a TV set-top box and not merely sent thereby. The prior art makes no provision for such a service.

SUMMARY OF THE INVENTION

It is an object of the invention to provide a method and system for allowing SMS messages not only to be transmitted by but also to be received at a TV set-top box via TV communication infrastructure or Direct Broadcast by Satellite (DBS).

This object is realized in accordance with a first aspect of the invention by a method to convey SMS messages via a TV communication infrastructure for receipt by a TV set-top box having a unique ID, the method comprising the following operations:
 (a) receiving an SMS message destined to a TV subscriber,
 (b) identifying the unique ID of the TV subscriber's TV set-top box, and
 (c) forwarding to the TV subscriber's TV set-top box data relating to the SMS message.

According to a second aspect of the invention, there is provided a method for allowing SMS messages to be conveyed via a TV communication infrastructure for receipt by a TV set-top box having a unique ID, the method comprising the following operations:
 (a) receiving an SMS message via a communication network,
 (b) identifying that the SMS message is destined to a TV subscriber, and
 (c) conveying the SMS message to a TV communication gateway to identify the unique ID of the TV subscriber's TV set-top box and forwarding the SMS message thereto.

According to a third aspect of the invention, there is provided a method for allowing SMS messages to be conveyed via a TV communication infrastructure for receipt by a TV set-top box having a unique address, the method comprising the following operations:
 (a) logging on to a TV communication gateway that is in communication with the TV set-top box so as to inform the TV communication gateway of said unique address,
 (b) receiving the SMS message from the TV communication gateway, and
 (c) displaying the SMS message on a TV set coupled to the TV set-top box.

A cellular communication device for use with the invention includes an encoder for encoding an SMS message with one or more parameters indicating that the SMS message is destined for a TV communication set-top box and indicating a unique address of the TV communication set-top box.

According to another aspect of the invention, there is provided a TV communication gateway configured to convey SMS messages via a TV communication infrastructure to a TV set-top box having a unique address, the TV communication gateway comprising:
 an input port configured to receive an SMS message destined to a TV subscriber;
 a processor, coupled to the input port, configured to identify the unique address of the TV subscriber's TV set-top box;
 a memory coupled to the processor configured to store the SMS message; and
 an output port, coupled to the processor, configured to forward data relating to the SMS message to the TV subscriber's TV set-top box.

The invention also encompasses a server configured to convey SMS messages via a TV communication infrastructure to a TV set-top box having a unique address, the server comprising:
 an input port configured to receive an SMS message transmitted from a wireless mobile communication device;
 a processor, coupled to the input port, configured to process the SMS message and identify that the SMS message is destined to a TV subscriber; and
 an output port, coupled to the processor, configured to convey the SMS message to a TV communication gateway to identify the unique address of the TV subscriber's TV set-top box, and to forward the SMS message thereto.

According to yet another aspect, the invention provides a TV set-top box having a unique address configured to receive SMS messages to be conveyed via a TV communication infrastructure, the TV set-top box comprising:

a communication port configured to establish bi-directional communication with the TV communication gateway;

a processor coupled to the communication port for logging on to the TV communication gateway so as to convey said unique address thereto and to receive data representative of the SMS message therefrom; and a TV connection port, coupled to the processor, connected to a TV set to display thereon the SMS message.

BRIEF DESCRIPTION OF THE DRAWINGS

In order to understand the invention and to see how it may be carried out in practice, a preferred embodiment will now be described, by way of non-limiting example only, with regard to a CATV communication system and with reference to the accompanying drawings, in which.

DETAILED DESCRIPTION OF SPECIFIC EMBODIMENTS

Figure 1:
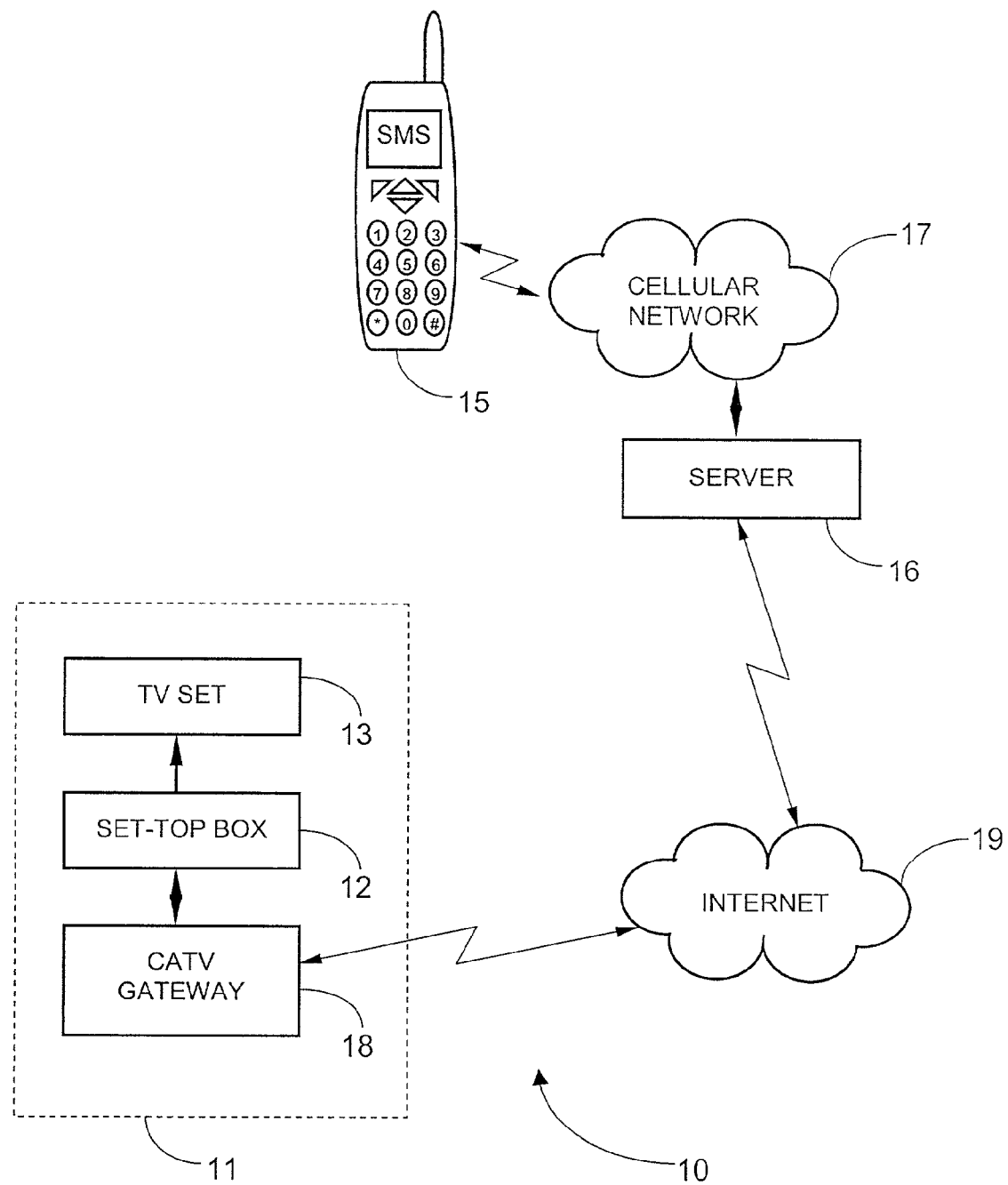
FIG. 1 is a pictorial representation of a system for allowing SMS messages to be conveyed via a CATV infrastructure to a TV set-top box of a destined subscriber.

FIG. 1 is a pictorial representation of a system depicted generally 10 for allowing SMS messages to be conveyed via a CATV infrastructure 11 to a TV set-top box 12 of a destined subscriber operating a TV set 13. Typically, the destined subscriber is a family member (constituting a group member) having a unique ID and the TV set-top box 12 has a unique address to which messages may be directed. In this connection, it is to be understood that the address of the TV set-top box and the unique ID of a family member are different parameters, both of which must be embedded in the SMS message if the SMS message is destined for a specific family or group member associated with the TV set-top box. In those cases where all family associated with a given TV set-top box may be permitted to receive the SMS message, it is sufficient to include therein data indicative of the address only of the TV set-top box and not the ID of the family members. The address of the TV set-top box is required in order that the SMS message may be routed to the correct TV set-top box. The ID of the family member, when included, is used by software in the TV set-top box to ensure that only the authorized family member can open the SMS message. To the extent that the SMS message is private and is intended for a specific family member, it is encrypted using the unique ID of the particular destined family member so as to be inaccessible to other family members.

A cellular telephone 15 (constituting a cellular communication device) encodes the SMS message with one or more parameters indicating that the SMS message is destined for a TV set-top box. Such parameters include a service ID that distinguishes between a message that is to be sent to a cellular phone and a message that is to be sent to a TV. For ease of use, the TV set-top box may have the same nominal address as a cellular telephone number of the same recipient. For example, if the cellular telephone number is 053 123 456, then an SMS message sent to the TV set-top box is directed to 333 053 123 456, where the prefix "333" identifies that the outgoing SMS message is destined for a TV set-top box and not to the regular cellular telephone, having the same nominal address. The prefix "333" thus ensures that the message received by the SMSC machine is forwarded to a TV gateway rather than a cellular provider. However, it should be noted that the actual address of the TV set-top box does not have to be included in an outgoing SMS message, since any unique identifying code that uniquely defines the TV set-top box may be used and then mapped to the appropriate address by the TV gateway.

To this end, the TV gateway maintains a database of TV set-top box addresses and corresponding identity codes. The database may also store, in respect of each TV set-top box, a parameter indicating that a received SMS message is also to be sent to the TV subscriber's regular cellular telephone number. In such case, the TV subscriber will receive the SMS message at both his or her TV set and cellular telephone, indicating the unique ID of the TV set-top box 12. A server 16 typically operated by a cellular service provider, receives the SMS message from the cellular telephone 15 via a cellular network 17, as is well known in the art.

Upon determining that the SMS is destined for a TV set-top box (i.e., based on the parameters provided by the user of telephone 15), the server 16 forwards the SMS message to a CATV gateway 18. The CATV gateway 18 is shown coupled to the Internet 19 thus requiring that the SMS message be conveyed from the cellular network 17 to the Internet 19. This, too, is known for example from WO 0163883 published Aug. 30, 2001 in the name of Telecommunication Systems, Inc., and entitled "Prepaid Short Messaging", the contents of which are incorporated herein by reference.

It will be understood that the cellular telephone 15 may comprise any wireless and/or mobile communications device. It may also comprise such a device incorporated or coupled with a PDA, palmtop, or hand-held device or other device capable of performing the functions of a mobile telephone as herein described.

It will also be understood that although in the above embodiment, SMS messages are conveyed over the Internet, SMS messages can be delivered to the SMS gateway using any existing network (e.g. frame relay).

The CATV gateway 18 stores the SMS message and processes it to extract the address of the TV set-top box 12 to which the SMS message is destined. To this end, the address of the destination TV set-box 12 may be embedded in the SMS message. Alternatively, as noted above, the SMS message may contain a unique identity code of the TV set-top box 12 and the address may be extracted from a database 20 (shown in FIG. 2) using the identity code as an index. The CATV gateway 18 conveys a notification to the TV set-top box 12 so as to alert the appropriate TV subscriber.

The TV set-box 12 includes software for alerting a specified family member and for allowing only the specified family member to open a received SMS message, although all family members are able to view the notification alert. To this end, each of the family members has a different password and a subscriber profile that is stored on the database 20. Where a message is destined for a specific family member, a suitable identity group code is appended to the TV set-top address in the SMS message. For example, a suffix from "0" to "9" may be used to identity a specific one of up to ten family members. Alternatively, a suffix from "1" to "9" may be used to identity a specific one of up to nine family members and a suffix equal to "0": may be used to indicate that any family member may access the SMS message. Upon receiving the destination address from the SMS message or the identity code of the destination TV set-top box 12, the SMS message is routed to the destination TV set-top box 12 together with the suffix identifying which family member or members are authorized to read it. The CATV gateway 18 thus serves as an "inbox" for storing SMS messages and allowing those messages to be conveyed to the TV set-top box 12 for display when accessed by the authorized end-user. When an incoming SMS message is restricted to a specific family member, software in the TV set-top box allows access to the SMS message by the intended family member on entry of a correct password, in a manner similar to that employed by computer networks for ensuring that only authorized users can log on to a central server or access files stored thereon.

Figure 2:
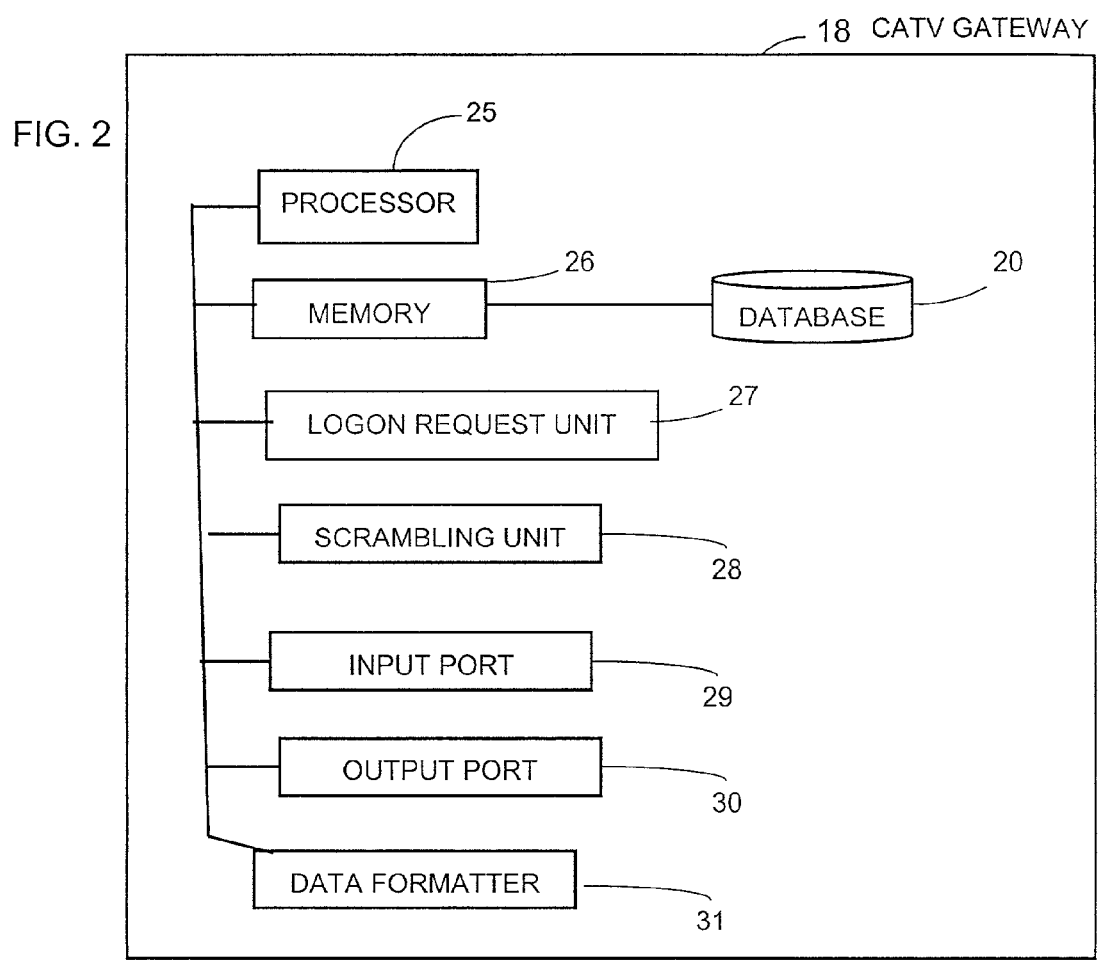
FIG. 2 is a block diagram showing functionally a CATV gateway for use with the system of FIG. 1.

FIG. 2 is a block diagram showing functionally the CATV gateway 18 including a processor 25 coupled to a memory 26 storing data representative of an SMS message. A logon request unit 27 is coupled to the processor 25 for processing a logon request received from a TV set-top box and a scrambling unit 28 allows the SMS message to be scrambled prior to conveying the message to a TV set-top box. By such means, it may be ensured that only the correct TV set-top box can read the message. To this end, the TV set-top box is provided with a decryption mechanism as a standard component to allow so-called "Conditional access". Conditional access is a technology used to control access to digital television services by encrypting the transmitted programming so that only authorized users are able to view a transmission. The manner in which this is done is well known in the art and is not itself a feature of the invention.

Moreover, if the destined TV set-top box is set up for multiple users, such as different members of a family or another group, each having his or her own ID, then the TV set-top box may be provided with software so that only the intended subscriber can open it. As noted above, such software is well-known and operates in a manner similar to the manner in which an exchange server allows restricted access to multiple e-mail clients so that each client can access only his or her e-mail message.

An input port 29 and an output port 30 are coupled to the processor 25 for respectively receiving an SMS message from the server 16 and conveying it to a destined TV set-top box via the CATV infrastructure 11.

The processor 25 processes an incoming SMS message received at the input port 29 for identifying the unique ID of the CATV subscriber's TV set-top box, and stores the SMS message in the memory 26. The processor 25 then queries the database 20 coupled to the memory 26 for extracting an address of the destined TV set-top box. A data formatter 31 coupled to the processor 25 then compiles a notification for alerting the subscriber of the TV set-top box 12 of an awaiting SMS message and data representative of the notification is sent via the output port 30 to the TV set-top box 12. The notification data may simply be a text message of the form "an SMS message has been sent to John Doe". Alternatively, where a TV set-top box is associated with multiple group members, a different icon may be stored in the database 20 for each group member and data corresponding to the destined group member may be sent as part of the notification data.

For example, assuming that suffixes "1" to "4" are used respectively for "father", "mother", "daughter" and "son" in a family having four members, there may be stored in the TV set-top box different icons identifying each member. When a received message is destined for the mother, as shown by the suffix "2" in the SMS message, the icon pertaining to the mother may be displayed. All family members see the displayed icon and are thus alerted that an SMS message has arrived for the mother; but only the mother can view the content of the SMS message since only she knows the correct password.

Accordingly, there may be displayed on the TV set 13, under control of the TV set-top box 12, an icon that identifies the intended recipient. The same may be achieved by storing different icons at the TV set-top box, one for each different group member and encoding the notification data sent by the CATV gateway 18 to identity the appropriate icon. The data formatter 31 may be configured to format the notification data to include coordinates for displaying the notification at a specified location on a TV set of the CATV subscriber. Alternatively, the data formatter 31 may be configured to format the notification data to include an instruction for illuminating an indicator lamp, such as an LED (shown as 44 in FIG. 4) in the TV set-top box 12. Such data may also initiate display of an indication on a display or any type of suitable screen, including an LCD screen that does not necessarily give off light. The screen can also be the screen of the TV set, predetermined pixels of which can be illuminated under control of the TV set-top box 12 to provide the required indication.

The TV set-top box 12 may comprise any device that can be used in association with a television to interface with a cable television system, a broadcast television system, and/or a satellite television system. The TV set-top box 12 may comprise devices physically incorporated into or coupled with a television set. It may also be coupled to a computer, processor, local area network, or other device provided it may be used to accomplish the purposes herein described.

The TV set 13 may comprise a television or any device incorporating a television or the features of a television. The TV set 13 may comprise devices using a CRT monitor, a flat panel, an LCD, a projection or other such displays capable of outputting or presenting visual information to a user. It may also comprise or be coupled to a computer or other device provided it may be used to accomplish the purposes herein described.

The logon request unit 27 processes a logon request sent by a TV set-top box for establishing whether the logon request is valid, i.e. corresponds to a registered subscriber. The logon request identifies the unique address of the sending TV set-top box as well as the identity code of the current subscriber when multiple group members are associated with the identified TV set-top box, each having a separate identity code. The CATV gateway 18 can determine from its database whether an SMS message stored in the memory 26 belongs to the identified TV set-top box 12. If so the SMS message content stored in the memory 26 is scrambled by the scrambling unit 28 and conveyed to the TV set-top box 12. All messages/information sent to the set-top box are scrambled by an existing encryption mechanism and decrypted by the set-top box, if the message belongs to it. In order to send an SMS message from the TV, a user must log-in to the application by using a password, thereby enabling the family member using the application to be identified. The message is scrambled in order to protect an eavesdropper who fraudulently obtains the message from being able to decipher it. Scrambling is a standard feature of CATV systems, particularly for transmitting Pay-TV programs and the like. However, it will readily be understood that scrambling the SMS message is not an essential feature of the invention and could be dispensed with, particularly in cases where the SMS message is not confidential.

Figure 3:
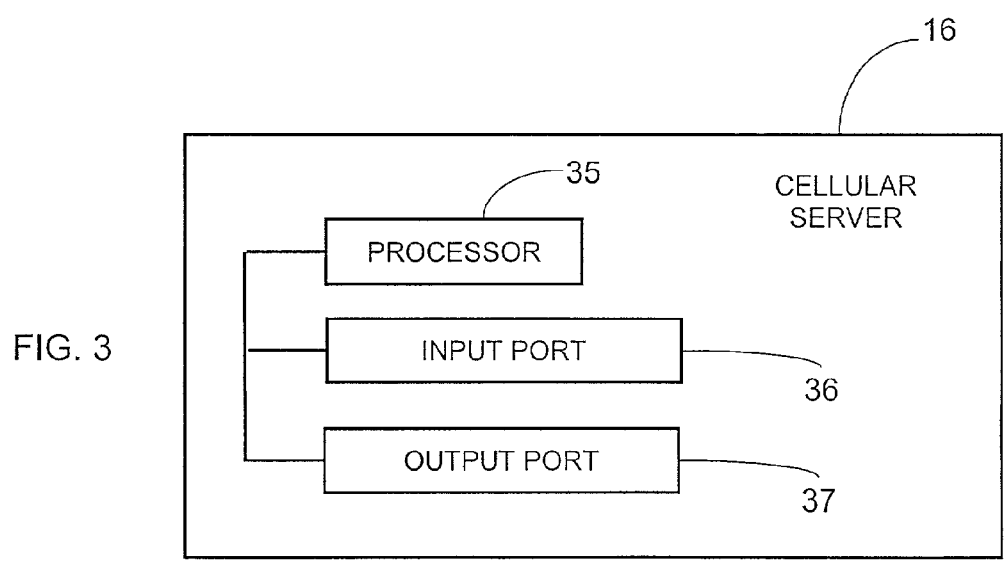
FIG. 3 is a block diagram showing functionally a cellular service provider server for use with the system of FIG. 1.

FIG. 3 is a block diagram showing functionally a cellular service provider server 16, comprising a processor 35 coupled to an input port 36 for receiving an SMS message, and to an output port 37 coupled to the CATV gateway 18. The processor 35 processes the SMS message for identifying whether it is destined to a CATV subscriber and, if so, for conveying the SMS message via the output port 37 to the CATV gateway 18.

Figure 4:
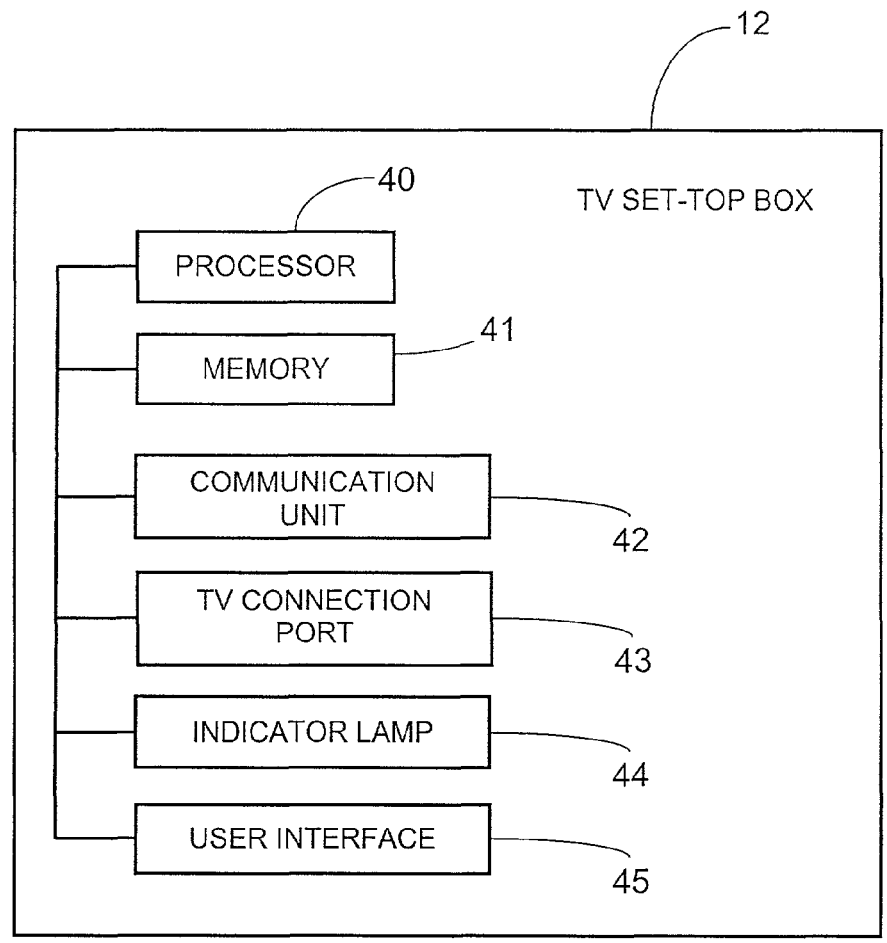
FIG. 4 is a block diagram showing functionally the TV set-top box for use with the system of FIG. 1.

FIG. 4 is a block diagram showing functionally the TV set-top box 12 comprising a processor 40 coupled to a memory 41 and a communication unit 42 for establishing bi-directional communication with the CATV gateway 18. A TV connection port 43 is coupled to the processor 40 for connecting to the TV set 13 thus allowing display of the notification of an awaiting SMS message, as well as the SMS message content. The processor 40 operates in conjunction with the communication unit 42 for logging on to the CATV gateway 18 so as to convey the unique ID of the TV set-top box 12 to the CATV gateway 18 and to receive therefrom data representative of the awaiting SMS message. As noted above, such data may include a notification of arrival of the SMS message, the processor 40 being responsive to the notification data for alerting a CATV subscriber of the TV set-top box 12 that an SMS message has arrived at the CATV gateway 18. The notification data may include display coordinates at which the notification is to be displayed, the processor 40 being configured to display the notification at the specified location on the TV set 13 connected to the TV connection port 43. The processor 40 may also be responsive to the notification data for illuminating the indicator lamp 44. A user interface 45, which may include a remote control, a keyboard, such as a wireless keyboard that communicates with the TV set top box (e.g., by infrared signals) coupled to the processor 40 allows input by the CATV subscriber for logging on to the CATV gateway 18 as well as entering auxiliary commands.

Figure 5:
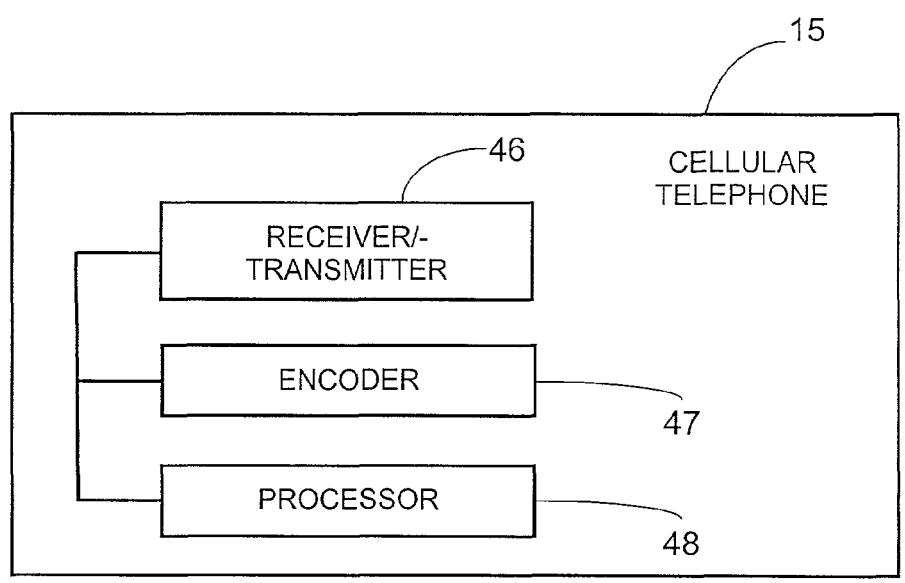
FIG. 5 is a block diagram showing functionally a cellular communication device for use with the system of FIG. 1.

FIG. 5 is a block diagram showing functionally the relevant details of the cellular telephone 15, comprising a receiver/transmitter 46 coupled to an encoder 47 and a processor 48. The encoder 47 encodes an SMS message with one or more parameters indicating that the SMS is destined for a TV set-top box and indicating a unique ID of the TV set-top box. Where the SMS message is destined to a specific group member, the parameters encoded by the encoder 47 include an identity (an identifier) of the specific group member to whom the SMS message is to be conveyed.

Figure 6:
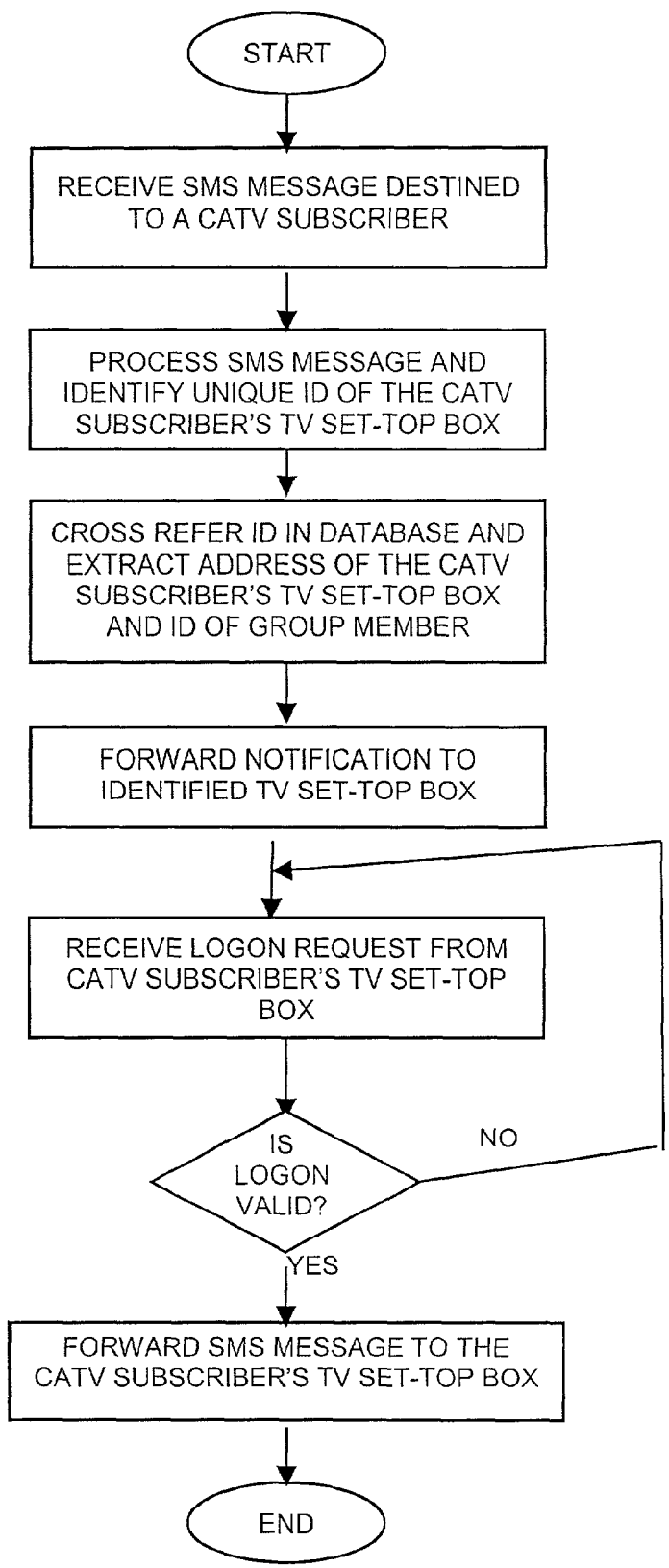
FIG. 6 is a flow diagram showing the principal operations carried out by a CATV gateway in the system of FIG. 1.

FIG. 6 is a flow diagram showing the principal operations carried out by the CATV gateway 18. Thus, the CATV gateway 18 receives and processes an incoming SMS message for identifying the unique ID of the CATV subscriber's set-top box 12. It then cross-references the ID in the database 20 and extracts the address of the set-top box 12 and, if necessary, the ID of the group member for whom the SMS message is intended. It then forwards a notification to the identified TV set-top box 12. This is done without the TV set-top box 12 having to log on to the CATV gateway 18 and alerts a subscriber of an awaiting SMS message. In order to send a notification to set-top box 12, a subscriber does not need to log-in, since it is sufficient that communication is established between the CATV gateway 18 and the TV set-top box 12 in order to alert the TV set-top box 12 that an SMS message is awaiting a TV subscriber associated with that TV set-top box 12. Upon receiving a valid logon request from the TV set-top box 12, the CATV gateway 18 forwards the SMS message thereto.

Figure 7:
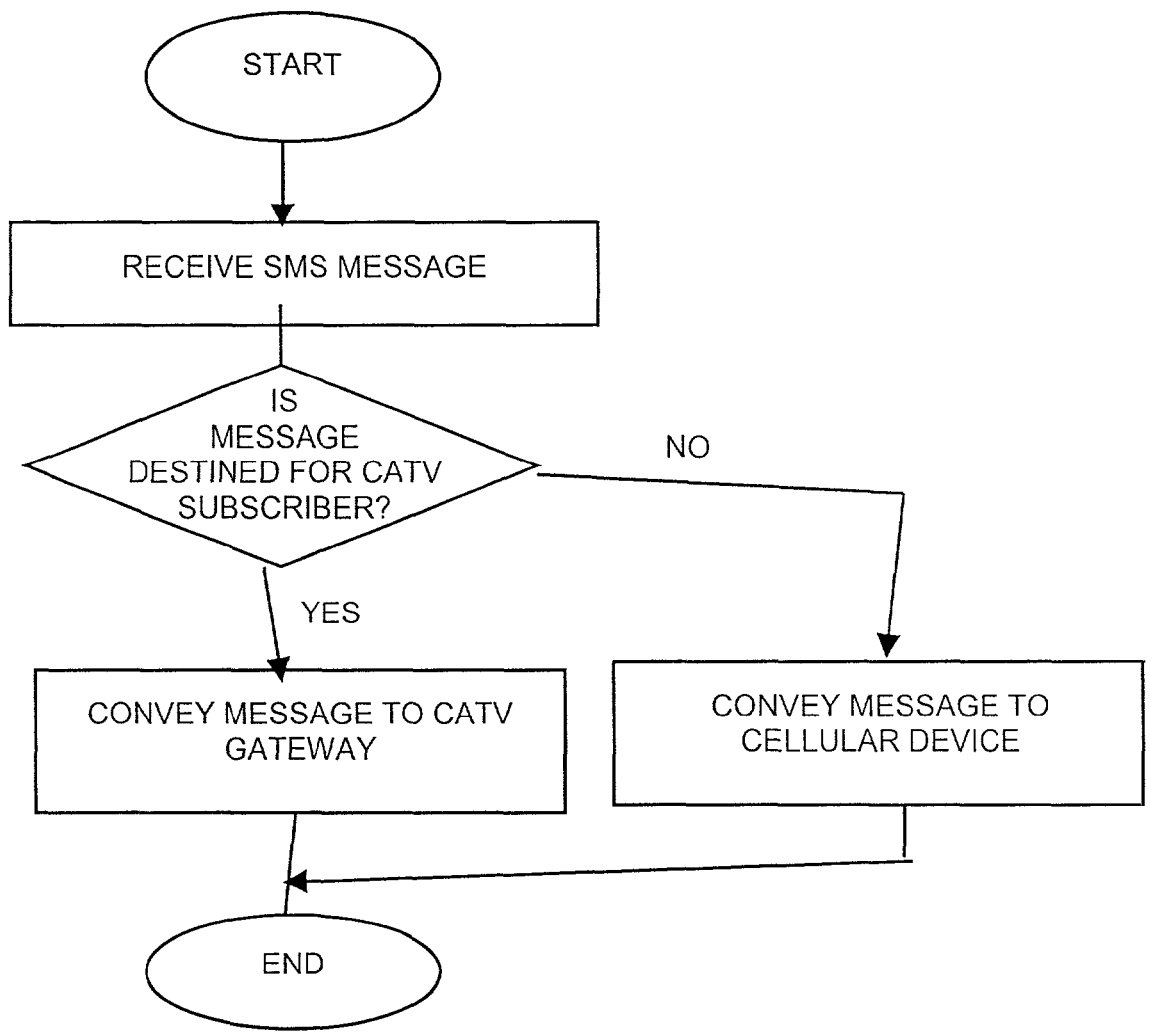
FIG. 7 is a flow diagram showing the principal operations carried out by a cellular service provider server in the system of FIG. 1.

FIG. 7 is a flow diagram showing the principal operations carried out by a cellular service provider server 16. Upon receiving an SMS message, the server 16 determines from SMS message parameters encoded in the message whether the message is destined for a CATV subscriber via the CATV infrastructure. If so, it routes the message to the CATV gateway 18. Otherwise, it routes the message to the requested cellular device in a normal manner.

Figure 8:
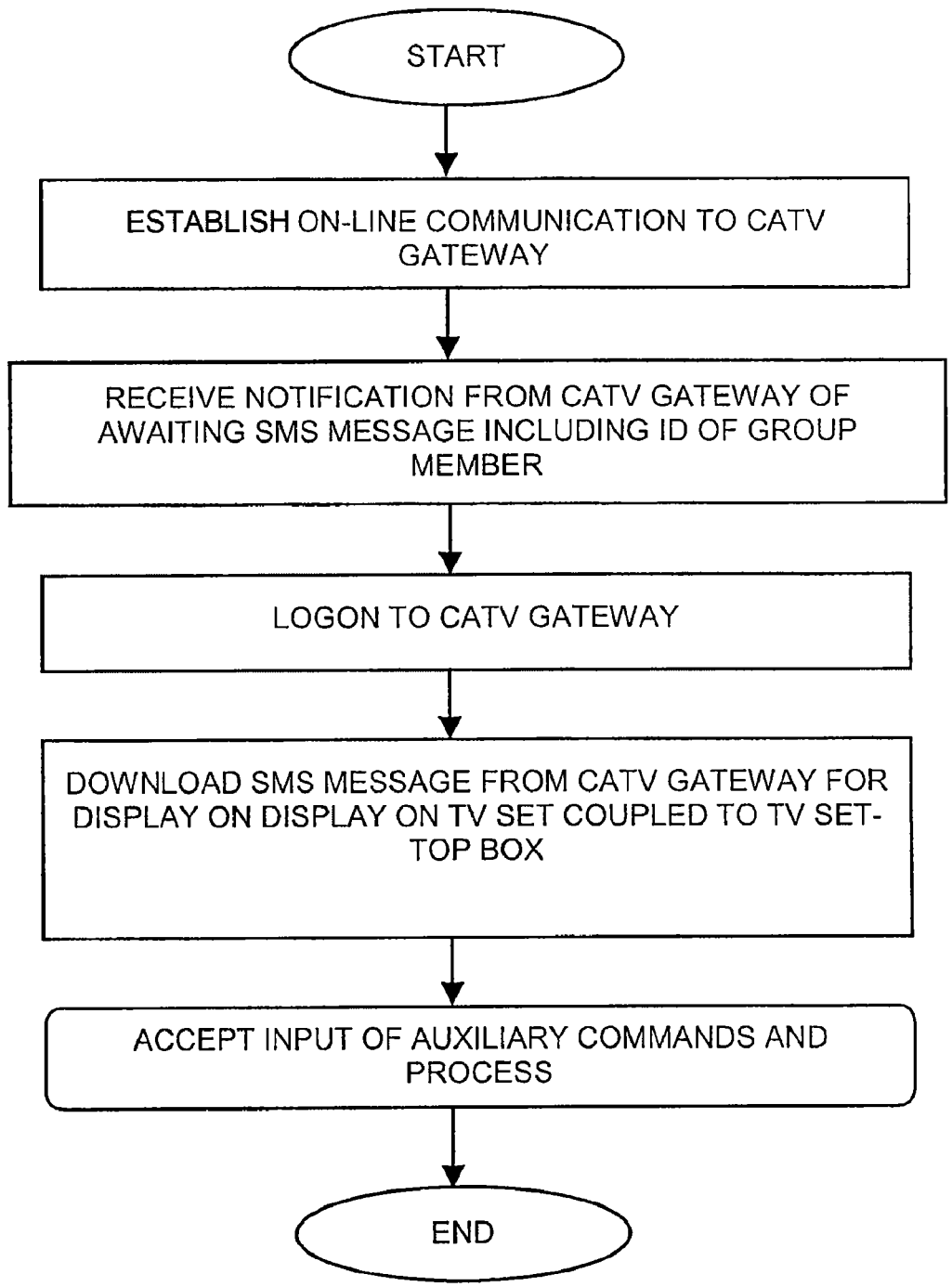
FIG. 8 is a flow diagram showing the principal operations carried out by the TV set-top box in the system of FIG. 1.

FIG. 8 is a flow diagram showing the principal operations carried out by the TV set-top box 12, which establishes on-line communication to the CATV gateway 18. The CATV gateway 18 receives and stores an SMS message. The CATV gateway 18 identifies which set-top box 12 belongs to the intended recipient of the SMS message. The CATV gateway 18 sends information to the identified set-top box 12. At the point when communication is established between the CATV gateway 18 and the set-top box 12, as shown in FIG. 8 the TV set-top box 12 may receive a notification that an SMS message is awaiting delivery. The notification may include an ID of a specific group member, which may be displayed textually or graphically via an appropriate icon. Alternatively, a list of group members may be displayed allowing selection of a desired group member and entry of a PIN code via the user interface 45.

For example, in the case of a domestic application, all family members authorized to access the TV set-top box 12 have corresponding identity codes stored in the TV set-top box 12. Likewise, as noted above, an icon may be stored in the TV set-top box 12 for each family member. Upon receiving an SMS message destined to more than one family member, the respective icons may be displayed under the control of software in the TV set-top box 12. A subscriber can click on one of the icons, or otherwise select it using a remote control or other suitable interface. The TV set-top box 12 will then prompt the user to enter the correct PIN associated with the identified subscriber and, if the correct PIN is entered, the SMS message pertaining to the identified family member will be displayed on the TV set 13 coupled to the TV set-top box 12. The TV set-top box 12 may include application software adapted to accept and process auxiliary commands entered by the subscriber via a user interface within the TV set-top box 12.

It will be understood that the novel features of the TV set-top box 12, of the cellular server 16, and of the CATV gateway 18 may be implemented via suitably programmed computers. Likewise, the invention contemplates computer programs being readable by the processors in the respective units for executing the methods of the invention. The invention further contemplates machine-readable memories tangibly embodying programs of instructions executable by the respective units for executing the methods of the invention.

It will also be appreciated that, while the invention has been described with particular regard to a CATV communication infrastructure, it is equally applicable to a satellite TV communication infrastructure. Thus, within the context of the appended claims, the term "TV communication infrastructure" embraces both a CATV infrastructure and a DBS infrastructure. Likewise, the term "TV communication gateway" embraces both a CATV gateway and a DBS gateway. In this connection it will be understood that the DBS gateway is accessed via a modem, typically connected to a telephone line in known manner.

In the method claims that follow, alphabetic characters and Roman numerals, if any, used to designate claim operations are provided for convenience only and do not imply any particular order for performing the operations.

The invention claimed is:

1. A method comprising:
   (a) receiving a short message service (SMS) message destined to a television (TV) set-top box, wherein said SMS message includes a unique identification (ID) of said TV set-top box;
   (b) storing said SMS message in a memory;
   (c) cross-referencing said unique ID in a database so as to determine a unique address of said TV set-top box;
   (d) extracting from said database an identification of a group member to whom said SMS message is directed;
   (e) forwarding to said TV set-top box data relating to said SMS message, wherein said data includes a notification, separate from said SMS message, for alerting a user of said TV set-top box that said SMS message has arrived at a TV communication gateway;
   (f) receiving a logon request that identifies said unique address of said TV set-top box; and after receiving said logon request:
   (g) obtaining said SMS message from said memory; and
   (h) sending said SMS message to said TV set-top box.

2. The method according to claim 1, wherein said data includes a content of said SMS message.

3. The method according to claim 2, further including:
   scrambling said data prior to forwarding said data to said TV set-top box.

4. The method according to claim 1, wherein said data includes coordinates for displaying said notification at a specified location on a TV set coupled to said TV set-top box.

5. The method according to claim 1, wherein said data includes an instruction for one of illuminating an indicator lamp and displaying an indication on a display coupled to said TV set-top box.

6. The method according to claim 1, wherein each of said receiving, and cross-referencing operations is performed by a cellular service system.

7. A television (TV) communication gateway comprising:
   an input port configured to receive a short message service (SMS) message destined to a TV set-top box, wherein said SMS message includes a unique identification (ID) of said TV set-top box;
   a processor, coupled to said input port, configured to cross-reference said unique ID in a database so as to determine a unique address of said TV set-top box, and extract from said database an identification of a group member to whom said SMS message is directed;
   a memory coupled to said processor, configured to store said SMS message;
   an output port coupled to said processor, configured to forward data relating to said SMS message to said TV set-top box;
   a data formatter to format said data, wherein said data includes a notification, separate from said SMS message, for alerting a user of said TV set-top box that said SMS message has arrived at said TV communication gateway; and
   a logon request unit that receives and processes a logon request that identifies said unique address of said TV set-top box,
   wherein, after said logon request unit receives and processes said logon request, said TV communication gateway:
   obtains said SMS message from said memory; and
   sends said SMS message to said TV set-top box.

8. The TV communication gateway according to claim 7, wherein said data includes a content of said SMS message.

9. The TV communication gateway according to claim 8, further including:
   a scrambling unit, coupled to said processor, configured to scramble said data prior to conveying said data to said TV set-top box.

10. The TV communication gateway according to claim 7, wherein said data formatter is configured to format said data to include coordinates for displaying, in response to receipt of notification to alert said user that an SMS message has arrived, a user notice at a specified location on a TV set coupled to said TV set-top box.

11. The TV communication gateway according to claim 7, wherein said data formatter is configured to format said data to include, in response to receipt of notification to alert said user that an SMS message has arrived, an instruction for one of illuminating an indicator lamp and displaying an indication on a display coupled to said TV set-top box.

12. A non-transitory program storage medium readable by a processor, said program storage medium including instructions to:
   receive a short message service (SMS) message destined to a television (TV) set-top box, wherein said SMS message includes a unique identification (ID) of said TV set-top box;
   store said SMS message in a memory;
   cross-reference said unique ID in a database so as to determine a unique address of said TV set-top box;
   extract from said database an identification of a group member to whom said SMS message is directed;
   forward to said TV set-top box data relating to said SMS message, wherein notification data separate from said SMS message is also sent to said TV set-top box prior to said SMS message in order to alert a user of said TV set-top box that said SMS message has arrived at a TV communication gateway;
   receive a logon request that identifies said unique address of said TV set-top box; and
   after receiving said logon request:
   obtain said SMS message from said memory; and
   send said SMS message to said TV set-top box.

13. A non-transitory computer readable medium comprising:
   instructions to receive a short message service (SMS) message destined to a television (TV) set-top box, wherein said SMS message includes a unique identification (ID) of said TV set-top box;
   instructions to store said SMS message in a memory;
   instructions to cross-reference said unique ID in a database so as to determine a unique address of said TV set-top box;
   instructions to extract from said database an identification of a group member to whom said SMS message is directed;
   instructions to forward to said TV set-top box data relating to said SMS message, wherein notification data separate from said SMS message is also sent to said TV set-top box prior to said SMS message in order to alert a user of said TV set-top box that said SMS message has arrived at a TV communication gateway;
   instructions to receive a logon request that identifies said unique address of said TV set-top box; and
   instructions to, after receiving said logon request:
   obtain said SMS message from said memory; and
   send said SMS message to said TV set-top box.

* * * * *

UNITED STATES PATENT AND TRADEMARK OFFICE
CERTIFICATE OF CORRECTION

| | | |
|---|---|---|
| PATENT NO. | : 8,201,196 B2 | Page 1 of 1 |
| APPLICATION NO. | : 10/158072 | |
| DATED | : June 12, 2012 | |
| INVENTOR(S) | : Michael et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1644 days.

Signed and Sealed this
Twenty-first Day of August, 2012

David J. Kappos
*Director of the United States Patent and Trademark Office*